United States Patent
Ten et al.

(10) Patent No.: US 8,414,285 B2
(45) Date of Patent: *Apr. 9, 2013

(54) MULTIPLE-GATE INJECTION MOLDING APPARATUS

(75) Inventors: Valery Ten, Burlington (CA); Peter Klobucar, Georgetown (CA); Denis Babin, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,854

(22) Filed: Feb. 21, 2012

(65) Prior Publication Data

US 2012/0156325 A1    Jun. 21, 2012

Related U.S. Application Data (60) Division of application No. 12/738,836, filed as application No. PCT/CA2008/001839 on Oct. 17, 2008, now Pat. No. 8,152,513, which is a continuation-in-part of application No. 11/875,318, filed on Oct. 19, 2007, now Pat. No. 7,618,253.

(51) Int. Cl.
    *B29C 45/23*    (2006.01)
(52) U.S. Cl. ......... 425/564; 425/566; 425/572; 425/573
(58) Field of Classification Search .................. 425/562, 425/563, 564, 565, 566, 570, 572, 573
See application file for complete search history.

(56) References Cited

U.S. PATENT DOCUMENTS

| 4,212,627 | A | | 7/1980 | Gellert |
| 4,378,963 | A | | 4/1983 | Schouenberg |
| 4,436,496 | A | | 3/1984 | Laghi |
| 4,932,858 | A | * | 6/1990 | Gellert .......................... 425/564 |
| 5,096,411 | A | | 3/1992 | Gellert |
| 5,368,470 | A | | 11/1994 | Manner |

(Continued)

FOREIGN PATENT DOCUMENTS

| CA | 2047461 A1 | 1/1993 |
| CN | 2863440 Y | 1/2007 |

(Continued)

OTHER PUBLICATIONS

"HPS III—230 V Externally Heated", *Ewikon Brochure* Aug. 1995.

(Continued)

*Primary Examiner* — Tim Heitbrink
(74) *Attorney, Agent, or Firm* — Medler Ferro PLLC (57) ABSTRACT

One or more nozzles define separate nozzle channels. The nozzles are coupled to a manifold, so that each of the nozzle channels communicates with a different mold gate. A molding material distribution insert is coupled to the manifold and has a body defining a distribution channel and a plurality of drop channels equal in number to the nozzle channels. The distribution channel is an open distribution channel formed on an outer surface of the body and enclosed by the manifold. The drop channels intersect the distribution channel and exit the body at a different one of the nozzle channels. A valve pin bushing can extend into the drop channels. Valve pins can extend from actuators, through the valve pin bushing and the drop channels, and to the mold gates. A valve pin holder can be coupled to the actuator and coupled to heads of the valve pins.

20 Claims, 12 Drawing Sheets

U.S. PATENT DOCUMENTS

| | | | |
|---|---|---|---|
| 5,536,164 | A | 7/1996 | Brun, Jr. et al. |
| 5,551,863 | A | 9/1996 | Hepler |
| 5,641,526 | A | 6/1997 | Gellert |
| 6,030,198 | A | 2/2000 | Babin |
| 6,135,751 | A | 10/2000 | Gellert et al. |
| 6,162,044 | A | 12/2000 | Babin |
| 6,196,822 | B1 | 3/2001 | Blundy |
| 6,394,779 | B1 | 5/2002 | Komazawa et al. |
| 7,125,246 | B2 | 10/2006 | Schmidt |
| 7,249,945 | B2 | 7/2007 | Schreck |
| 7,255,555 | B2 | 8/2007 | Babin |
| 7,618,253 | B2 * | 11/2009 | Ten et al. ............ 425/564 |
| 7,891,969 | B2 | 2/2011 | Olaru |
| 8,152,513 | B2 * | 4/2012 | Ten et al. ............ 425/564 |
| 2004/0164459 | A1 | 8/2004 | Babin et al. |
| 2006/0127527 | A1 | 6/2006 | Doyle et al. |
| 2007/0092597 | A1 | 4/2007 | Trakas |
| 2008/0160125 | A1 | 7/2008 | Fairy |

FOREIGN PATENT DOCUMENTS

| | | |
|---|---|---|
| DE | 3642343 C2 | 6/1988 |
| DE | 3733363 A1 | 4/1989 |
| DE | 3933281 A1 | 4/1990 |
| DE | 3906651 A1 | 9/1990 |
| DE | 4034934 C2 | 5/1992 |
| DE | 29504162 U | 5/1995 |
| DE | 4425981 A1 | 1/1996 |
| DE | 19943797 | 3/2001 |
| EP | 021273 B1 | 1/1981 |
| EP | 153592 B1 | 9/1985 |
| JP | 2000033634 A | 2/2000 |
| JP | 2002036310 A | 2/2002 |
| JP | 2006007658 A | 1/2006 |
| JP | 2007083661 A | 4/2007 |
| KR | 20050002766 | 1/2005 |
| WO | WO-2007029184 A2 | 3/2007 |

OTHER PUBLICATIONS

"HPS III—NV Valve Gate Systems", *Ewikon Brochure* Oct. 2004.

"International Search Report and Written Opinion", International Appl. No. PCT/CA2008/001839 Jan. 28, 2009.

\* cited by examiner

Section A-A

MULTIPLE-GATE INJECTION MOLDING APPARATUS

BACKGROUND OF THE INVENTION

1. Field of the Invention

This invention is relates to an injection molding apparatus.

2. Related Art

In injection molding hot runners designed for tight cavity pitch, where center-to-center nozzle channel spacing is on the order of millimeters, distribution of molding material from the mold inlet to the mold cavities is a substantial challenge.

It is typical in the art to use conventional manifold design but provide a nozzle in which a single inlet runner branches into a plurality of outlet runners. In such systems, tight pitch is achieved by the ability of the manufacturer to plan and make small-diameter and often skewed channels. However, this kind of branching design many times results in increased stack height, which can be undesirable.

SUMMARY OF THE INVENTION

According to one aspect of the present invention, a molding material distribution insert for a hot runner has a cylindrical body having a longitudinal axis, a distribution channel formed on a cylindrical outer surface of the body, and a plurality of drop channels formed in the body and intersecting the distribution channel. The distribution channel has a portion that follows a circumferential perimeter of the body. The drop channels exit the body at a first end.

BRIEF DESCRIPTION OF THE FIGURES

Embodiments of the present invention will now be described more fully with reference to the accompanying drawings, where like reference numbers indicate similar structure.

FIG. 4b is a cross-sectional view with respect to a section line A-A of FIG. 4a.

DETAILED DESCRIPTION OF THE INVENTION

Figure 1:
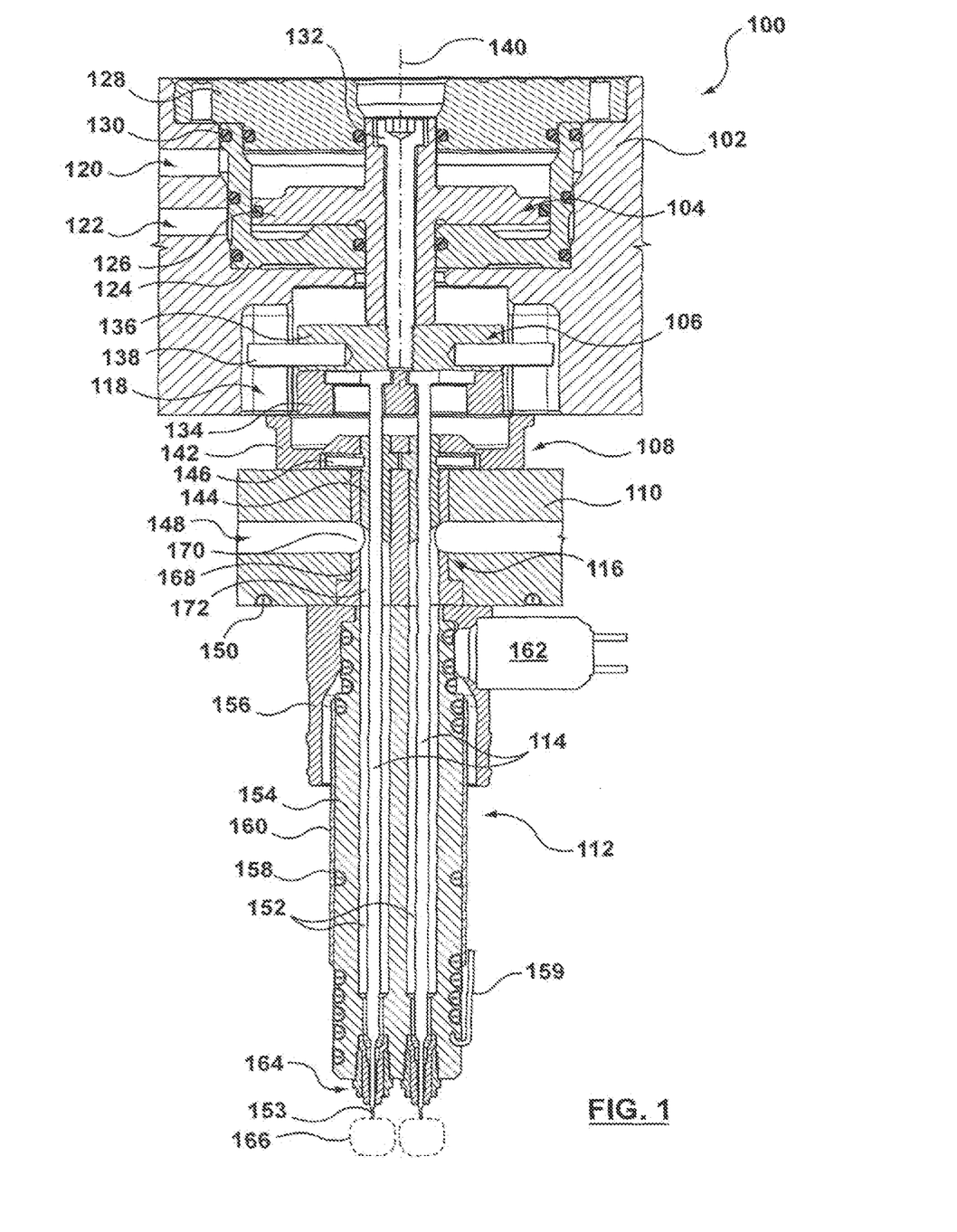
FIG. 1 is a cross-sectional view of a portion of an injection molding apparatus according to an embodiment of the present invention.

FIG. 1 shows a portion of an injection molding apparatus 100 according to an embodiment of the present invention. The features and aspects described for the other embodiments can be used accordingly with the present embodiment.

The injection molding apparatus 100 includes a back plate 102, an actuator 104, a valve pin holder 106, a valve pin bushing 108, a manifold 110, a nozzle 112, valve pins 114, and a molding material distribution insert 116. The injection molding apparatus 100 can include any number of manifolds and nozzles, in any configuration. In this embodiment, one manifold and one nozzle are shown for simplicity. The injection molding apparatus 100 can include additional components, such as mold plates, alignment dowels, mold gate inserts, and cooling channels, among others. The injection molding apparatus 100 is sometimes called a hot runner or hot half.

The back plate 102 has an opening for accommodating the actuator 104 and an opening for the valve pin holder 106 that communicates with the opening for the actuator. The back plate 102 has slots 118 extending laterally from the opening for the valve pin holder 106. If the actuator 104 depends on a working fluid for operation, fluid conduits 120, 122 are provided in the back plate 102. Should the actuator 104 be electric or magnetic or of some other design, the fluid conduits can be replaced with electrical conduits or can be omitted.

The actuator 104 is disposed in the back plate 102 and can be pneumatic, hydraulic, electric, magnetic, or of some other design. In this embodiment the actuator 104 is pneumatic. As such, the actuator includes a cylinder 124, a piston 126, a cap plate 128, and various O-rings 130. The piston 126 slides in the cylinder 124 in response to differential fluid pressure within the fluid conduits 120, 122. The piston 126 includes a central bore for receiving a bolt 132 that can be installed and removed via a central opening of the cap plate 128.

The valve pin holder 106 is coupled to the actuator by the bolt 132, which threads into the valve pin holder 106 but not necessarily into the piston 126 of the actuator 104. The valve pin holder 106 is coupled to the heads of the valve pins 114 so as to couple the valve pins 114 to the piston 126. In this embodiment, the valve pin holder 106 includes a bottom plate 134 having a plurality of valve pin slots and/or bores and a top member 136 connected to the bottom plate 134 for holding the valve pins 114 in the valve pin slots/bores. As shown, the top member 136 can be a plate that is bolt-connected to the bottom plate 134. In other embodiments, the top member 136 can be a threaded cap or similar.

Extending laterally from the valve pin holder 106 are several anti-rotation dowels 138. Each anti-rotation dowel 138 has one end coupled to the valve pin holder 106 and another end disposed in one of the slots 118 of the back plate 102. By virtue of their dimensions, each anti-rotation dowel 138 and slot 118 pair are configured to limit rotation of the valve pin holder 106 about a longitudinal axis 140 and allow translation of the valve pin holder 106 along the longitudinal axis 140. In this embodiment, the anti-rotation dowels 138 are installed into bores of the top member 136. In other embodiments, a single anti-rotation dowel can be used.

The valve pin bushing 108 is held to the manifold 110 by the back plate 102. The valve pin bushing 108 includes a main body 142 and a plurality of cylindrical bushing portions 144 connected to and extending from the main body 142. Each bushing portion 144 has a valve pin bore, which creates a seal with the valve pin 114 while still allowing the valve pin 114 to slide. Like the valve pins 114 in this embodiment, the valve pin bores are parallel. The valve pin bushing 108 further includes one securing dowel 146 for each bushing portion 144. Each securing dowel 146 has one end connected to a bushing portion 144 and another end connected to the main body 142 for securing the bushing portion 144 to the main body 142. The securing dowels 146 fix the orientation of the bushing portions 144 with respect to the main body 142, so that the angled ends of the bushing portions 144 are properly aligned to guide the flow of molding material.

The manifold 110 defines a manifold channel 148, a manifold heater 150, and an opening to accommodate the molding material distribution insert 116. The manifold 110 is coupled to the back plate 102 by way of a locating ring and a mold plate and/or other known structures (not shown). The manifold channel 148 receives molding material (e.g., plastic melt or thermoset material) from a mold inlet (not shown) or an upstream manifold (not shown). The manifold heater 150 can be of any design, such as the insulated resistance wire illustrated.

The nozzle 112 is coupled or sealed to the manifold 110 by any means (e.g., flange shouldering, bolts, screw-in, etc.) and defines a plurality of separate nozzle channels 152. In this embodiment there are four nozzle channels 152 (with two hidden from view), though more or fewer are acceptable. Each of the plurality of nozzle channels 152 communicates with a different mold gate 153 (defined by a mold plate or mold gate insert, for example—not shown) and is controlled by a different valve pin 114. In addition, in this embodiment the nozzle 112 includes a nozzle body 154, a nozzle flange 156, a nozzle heater 158 embedded in the nozzle body 154 and partially covered by a sleeve 160, a thermocouple 159, a terminal end 162 for connecting the heater 158 to a power source, and nozzle tip and tip retainer assemblies 164. The nozzle flange 156 is shouldered on a mold plate (not shown) to couple/seal the nozzle 112 to the manifold 110. In this embodiment, one nozzle tip and tip retainer assembly 164 is provided for each valve pin 114. In other embodiments, single-piece tips or other tip/retainer assemblies may be used. The nozzle 112 along with the manifold 110 and optionally some of the other components is sometimes called a hot runner. In addition, the nozzle and manifold heaters 150, 158 can be omitted and the injection molding apparatus 100 can be used to process cold-runner material.

Cavities 166 to form molded products are provided in communication with the mold gates 153. In this embodiment, each cavity 166 communicates with a different mold gate 153, in a one-to-one relationship. In other embodiments, a cavity could share one or more mold gates. When the cavities 166 are closely spaced, this can be referred to as tight pitch. However, tightly pitched cavities are not the only use for the present invention.

The molding material distribution insert 116 is coupled to the manifold 110. In this embodiment, the insert 116 is situated inside an opening of the manifold 110, much like a plug; however in other embodiments, a portion of the insert 116 could extend outside of the manifold 110. The insert 116 includes a cylindrical body 168 defining a distribution channel 170 in communication with the manifold channel 148 and a plurality of drop channels 172 equal in number to the plurality of nozzle channels 152. The drop channels 172 intersect the distribution channel 170 and exit the body 168 at the end adjacent the nozzle 112. Each drop channel 172 communicates with a different nozzle channel 152.

In this embodiment, the distribution channel 170 is an open channel formed on the cylindrical outer surface of the body 168. When the insert 116 in inserted into the manifold 110, the distribution channel 170 is enclosed by the manifold 110 and the manifold channel 148 becomes an inlet to the now enclosed distribution channel 170.

Figures 3A, 3B:
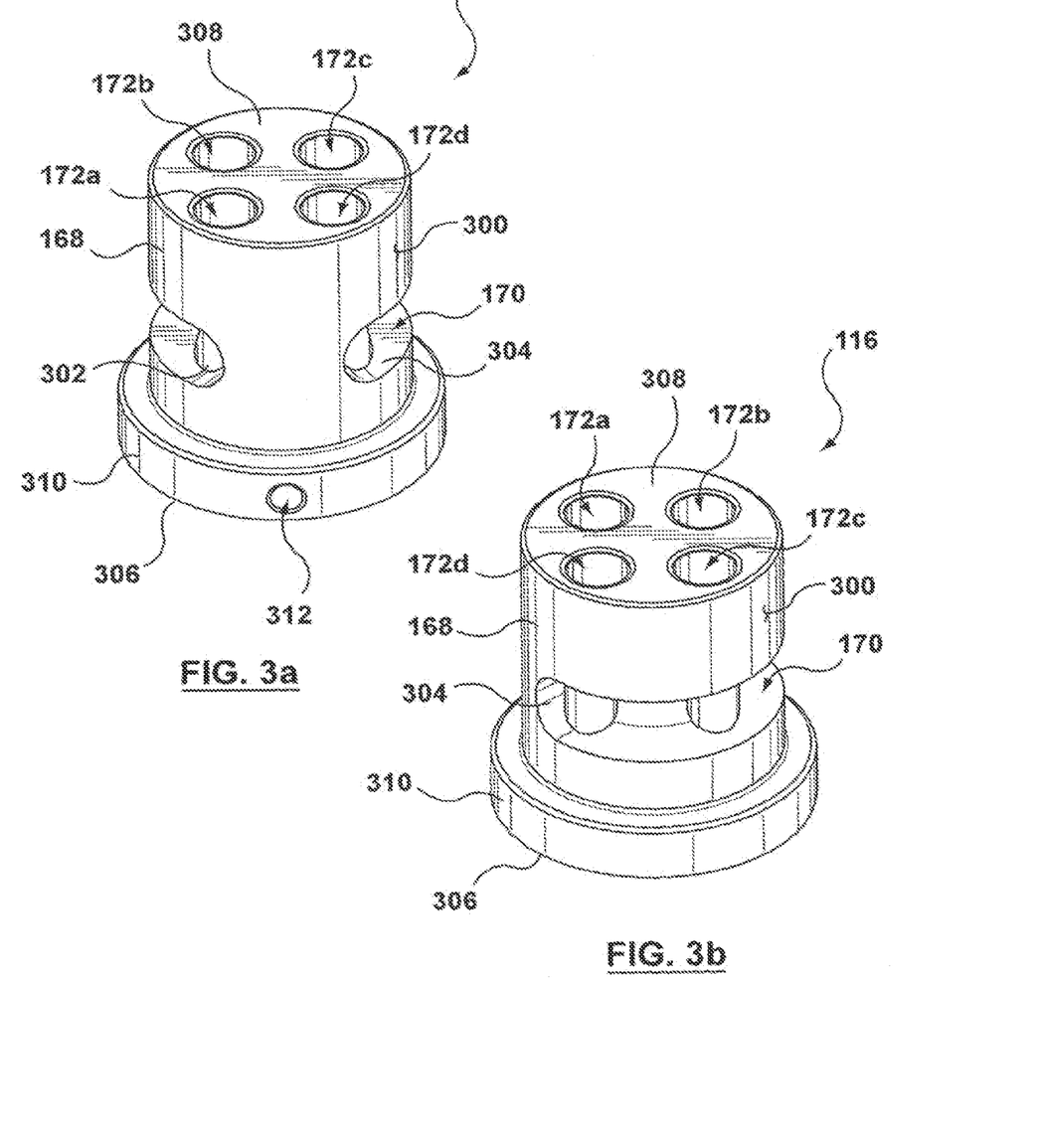
FIGS. 3a and 3b are perspective views of the molding material distribution insert of FIG. 1.

The drop channels 172 communicate with the distribution channel 170 and exit the body 168 at the downstream flat end (e.g., ref. 306 of FIG. 3) to convey molding material to the nozzle channels 152. The drop channels 172 can be bores, as shown, or can be open channels that are enclosed by the manifold 110 much like the distribution channel 170. In this embodiment, the drop channels 172 exit both ends of the body 168. At the upstream end, the bushing portions 144 of the valve pin bushing 108 extend into the drop channels 172 so that the valve pins 114 extend through the drop channels 172 and to the mold gates 153. In other embodiments, such as in thermal gating applications where there are no valve pins, the drop channels 172 do not need to exit the upstream end of the body 168 of the insert 116.

Regarding assembly, in this embodiment the molding material distribution insert 116 is brazed to the manifold 110. In other embodiments, the insert 116 can soldered, welded, or otherwise thermally/metallurgically joined to the manifold 110. In still other embodiments, the insert 116 can be press fitted, shrink fitted, bolted, threaded, or otherwise mechanically joined to the manifold 110. The bolt 132 facilitates assembly and disassembly of the injection molding apparatus 100 by allowing separation of the back plate 102 and the actuator 104 from the rest of the apparatus. When the bolt 132 is being tightened into the valve pin holder 106, the anti-rotation dowels 138 prevent undue stress on the valve pins 114.

Figure 2:
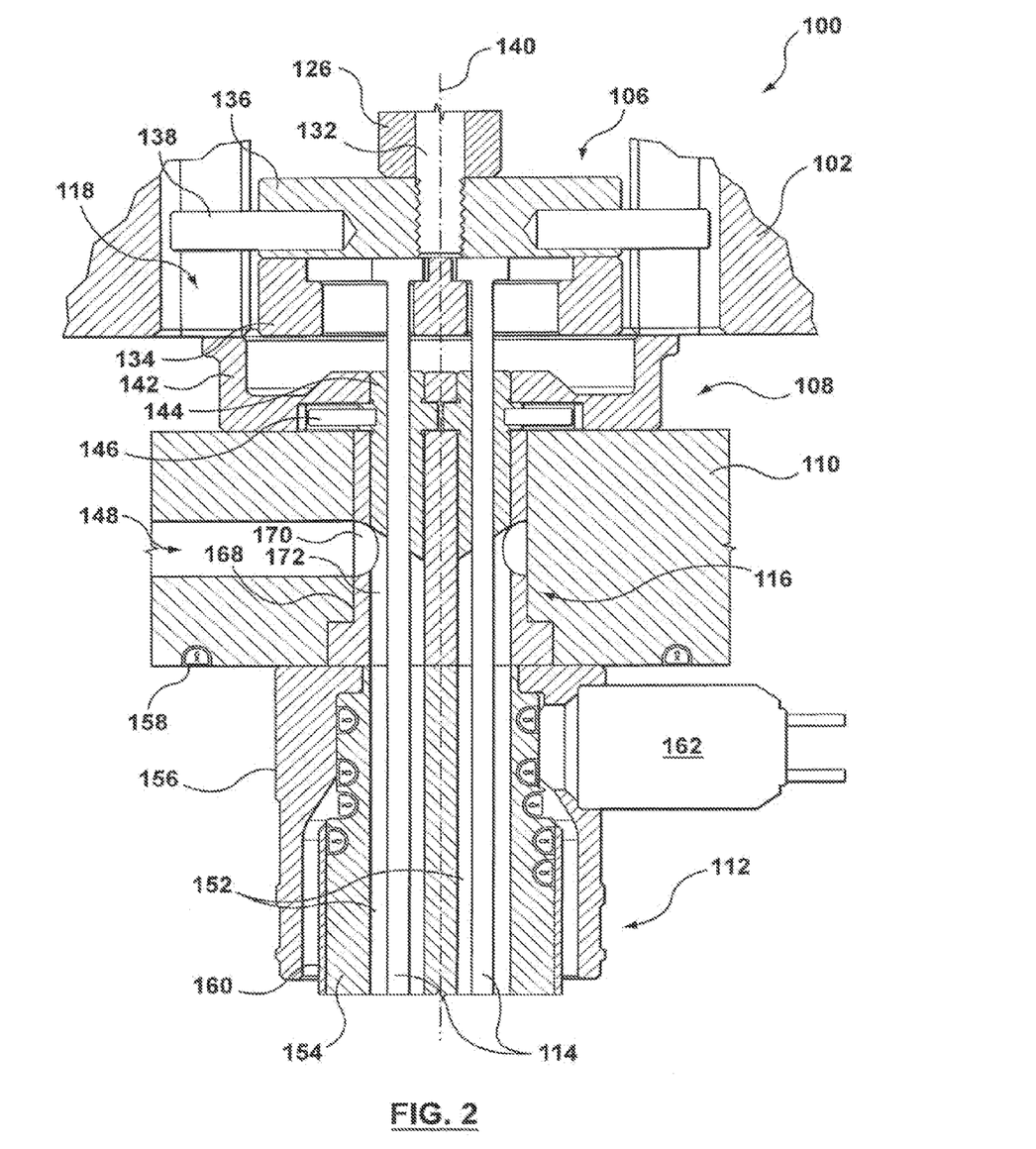
FIG. 2 is a cross-sectional view of a portion of the injection molding apparatus of FIG. 1.

FIG. 2 shows a close-up view of a portion of the injection molding apparatus of FIG. 1.

FIGS. 3a and 3b show perspective views of the molding material distribution insert 116. As shown, the annular or ring-shaped open distribution channel 170 is formed on the cylindrical outer surface 300 of the body 168, such that the distribution channel 170 follows a circumferential perimeter of the body 168. In this embodiment, the distribution channel 170 has two ends 302, 304, such that the distribution channel 170 does not complete a circle, but rather a portion of a circle.

In this embodiment there are four drop channels 172, marked 172a-d. In other embodiments there may be fewer or more drop channels, depending on the number of nozzle channels 152. The drop channels 172a-d intersect the distribution channel 170 and exit the body 168 at the downstream flat end 306 and at the upstream flat end 308. In this embodiment, the drop channels 172a-d are evenly spaced, and one end 302 of the distribution channel 170 terminates at a first drop channel 172a while the other end 304 of the distribution channel 170 terminates at a drop channel 172d adjacent the first drop channel 172a after having intersected all of the drop channels 172a-d. When the insert 116 is installed in the manifold 110, the manifold channel 148 meets the distribution channel 170 between the drop channels 172b and 172c.

Also shown in FIGS. 3a and 3b is a flange 310 that extends from the body 168 and aids in securing the insert 116 to the manifold 110. The cylindrical face of the flange 310 has a bore 312 for receiving an alignment dowel (not shown) having a protruding end that is inserted into a slot of the manifold 110 to properly align the insert 116 with the manifold channel 148.

Regarding manufacturing, in this embodiment the insert 116 is made from a unitary piece of material, such as steel, that is turned to achieve the cylindrical features. After turning, the distribution channel 170 is milled and the drop channels 172 are drilled. In another embodiment, the insert 116 could be cast. In certain circumstances, such as if the insert 116 is not brazed to the manifold 110, a portion of the cylindrical outer surface 300 can be machined to a sealing tolerance. The same applies to one of the surfaces of the flange 310. If the insert 116 is to be bolted to the manifold 110, bolt holes can be drilled into the flange 310. If the insert is to be threaded into the manifold 110, a thread can be machined into one of the cylindrical surfaces, such as the surface 300 or the cylindrical outside surface of the flange 310, to mate with a corresponding thread machined into the manifold 110.

Figure 4A:
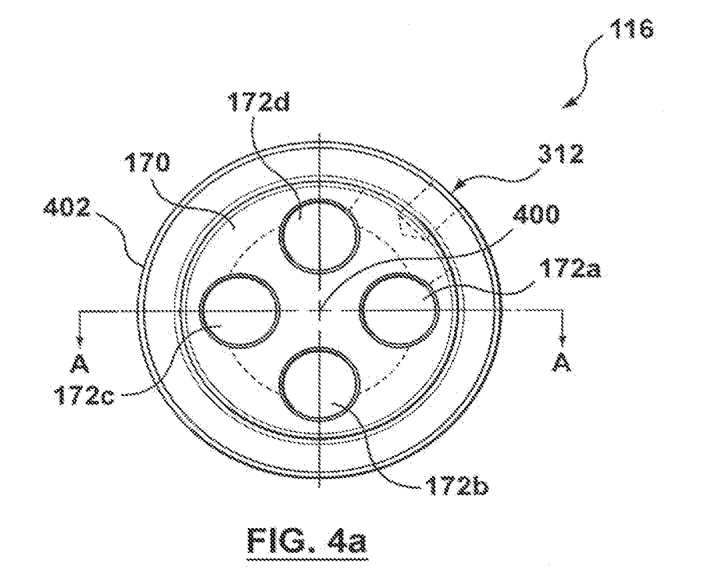
FIG. 4a is a top view of the molding material distribution insert of FIG. 1.
Figure 4B:
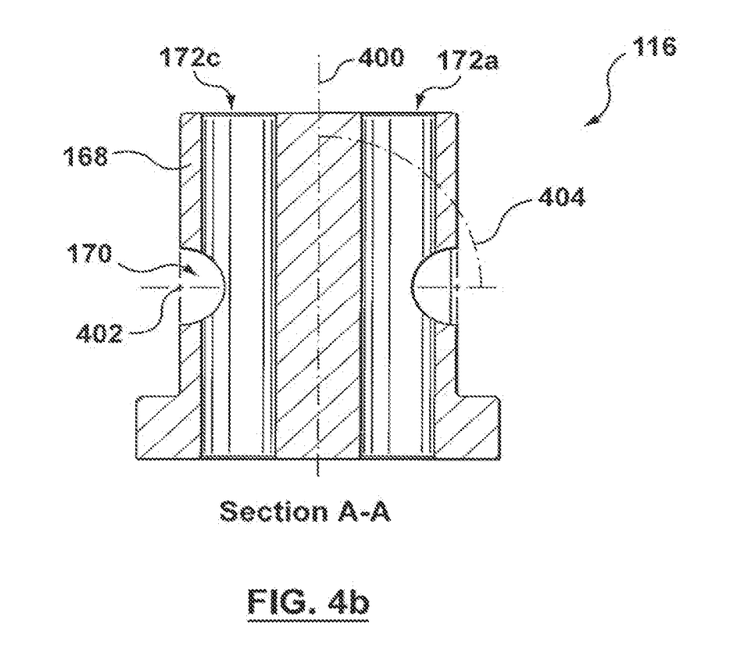

FIG. 4a shows a top view of the molding material distribution insert 116, and FIG. 4b shows a cross-sectional view of the insert 116 with respect to a section line A-A of FIG. 4a.

Shown in FIG. 4b is a longitudinal axis 400 of the cylindrical body 168 of the insert 116. The circumferential perimeter 402 that the distribution channel 170 follows is centered about the longitudinal axis 400 and defines a circle to which the longitudinal axis 400 is normal. This means that the angle 404 is 90 degrees. Of course, in other embodiments the angle 404 can have other values resulting in somewhat different geometries. It should be noted that the longitudinal axis 400 is not necessarily coincident with the longitudinal axis 140 of FIGS. 1 and 2. In this embodiment the axes 400, 140 are the same, but in other embodiments the axes 400, 140 can be laterally offset and/or at an angle with respect to each other. Such geometric variations can be taken into account when locating the distribution channel 170 and the drop channels 172.

Figures 5, 6:
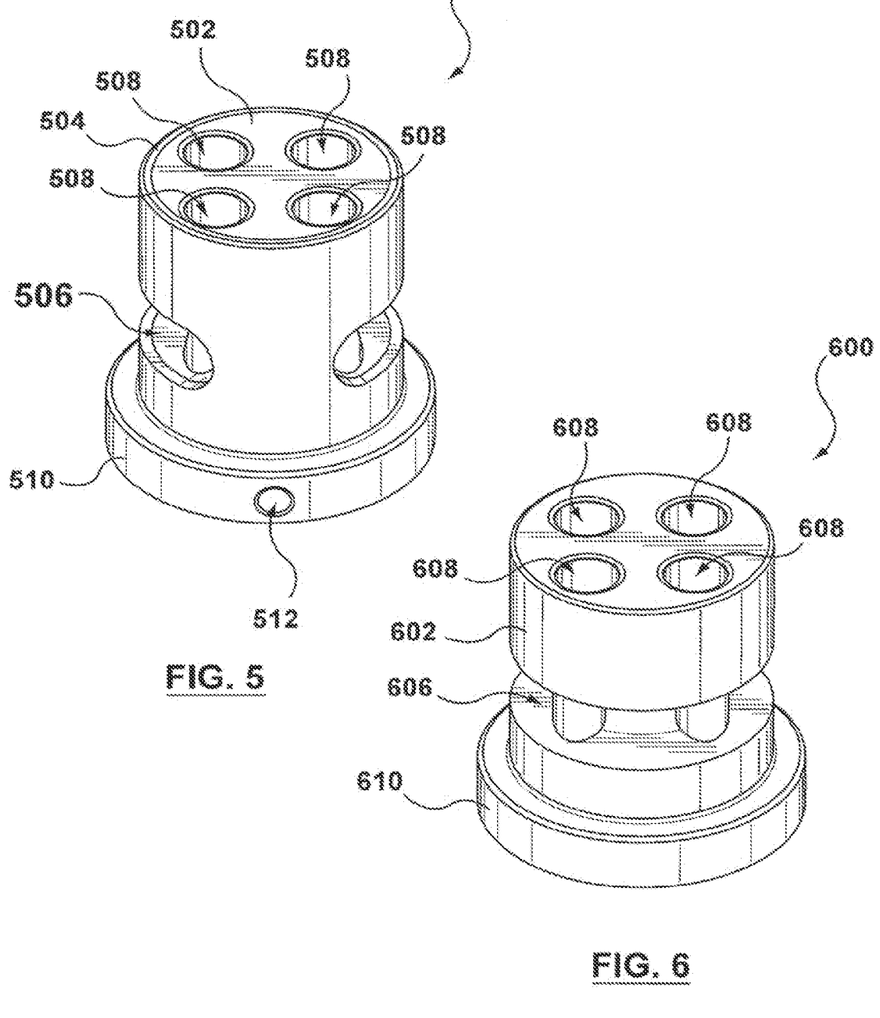
FIG. 5 is a perspective view of a molding material distribution insert according to another embodiment of the present invention.
FIG. 6 is a perspective view of a molding material distribution insert according to another embodiment of the present invention.

FIG. 5 shows a perspective view of a molding material distribution insert 500 according to another embodiment of the present invention. The features and aspects described for the other embodiments can be used accordingly with the present embodiment.

The insert 500 includes an inner body piece 502 and a hollow outer body piece 504 that is fit around the inner body piece 502. The inner body piece 502 and outer body piece 504 can be secured together by way of brazing, press fitting, or other methods. A distribution channel 506 is formed as a slot in the outer body piece 504. Drop channels 508 are formed in the inner body piece 502 and intersect with the distribution channel 506. A flange 510 extends from the outer body piece 504 and has a bore 512 for receiving an alignment dowel (not shown). The insert 500 is an example of one way of making a molding material distribution insert from two or more pieces, and other ways are possible as well.

FIG. 6 shows a perspective view of a molding material distribution insert 600 according to another embodiment of the present invention. The features and aspects described for the other embodiments can be used accordingly with the present embodiment.

The insert 600 includes a cylindrical body 602. A distribution channel 606 is formed in the body 602 and follows a circular path all the way around the body 602 such that the distribution channel 606 circumscribes the cylindrical body 602. Drop channels 608 are formed in the body 602 and intersect with the distribution channel 606. A flange 610 extends from the body 602. The insert 600 can be used in a manifold that has one manifold channel approaching the distribution channel 606 from one side and another manifold channel that approaches from the opposite side.

Figure 7:
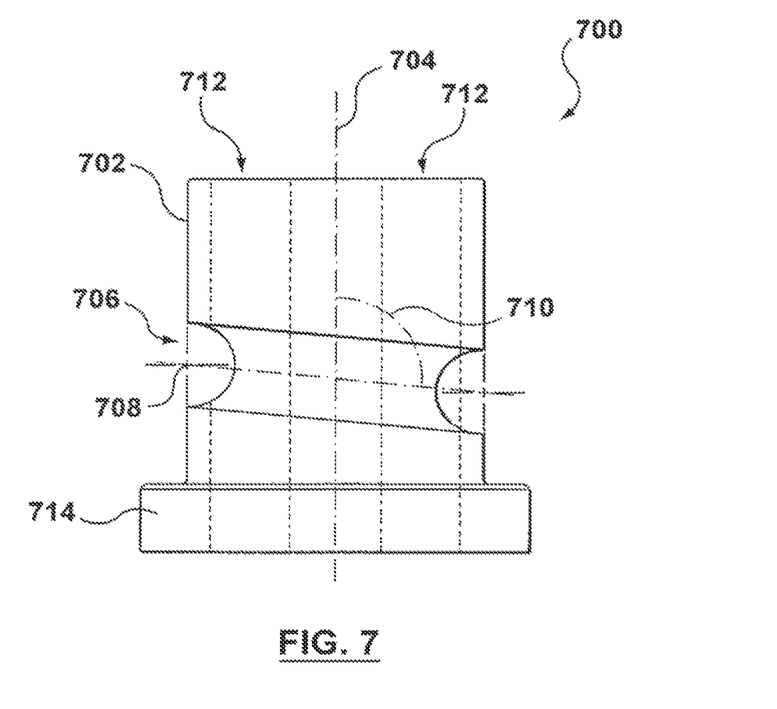
FIG. 7 is a side view of a molding material distribution insert according to another embodiment of the present invention.

FIG. 7 shows a side view of a molding material distribution insert 700 according to another embodiment of the present invention. The features and aspects described for the other embodiments can be used accordingly with the present embodiment.

The insert 700 includes a cylindrical body 702 having a longitudinal axis 704. An open distribution channel 706 is formed in an outside surface of the body 702 and follows a circumferential perimeter 708. The distribution channel 706 is tilted when compared with the embodiment shown in FIG. 3, resulting in the circumferential perimeter 708 defining a generally elliptical shape, when viewed along the axis 704, that is at a non-perpendicular angle 710 to the longitudinal axis 704. Drop channels 712 are formed in the body 702 and intersect with the distribution channel 706. The tilt of the distribution channel 706 means that the drop channels 712 intersect the distribution channel 706 at different points along the longitudinal axis 704. In addition, a flange 714 extends from the body 702.

Figure 8:
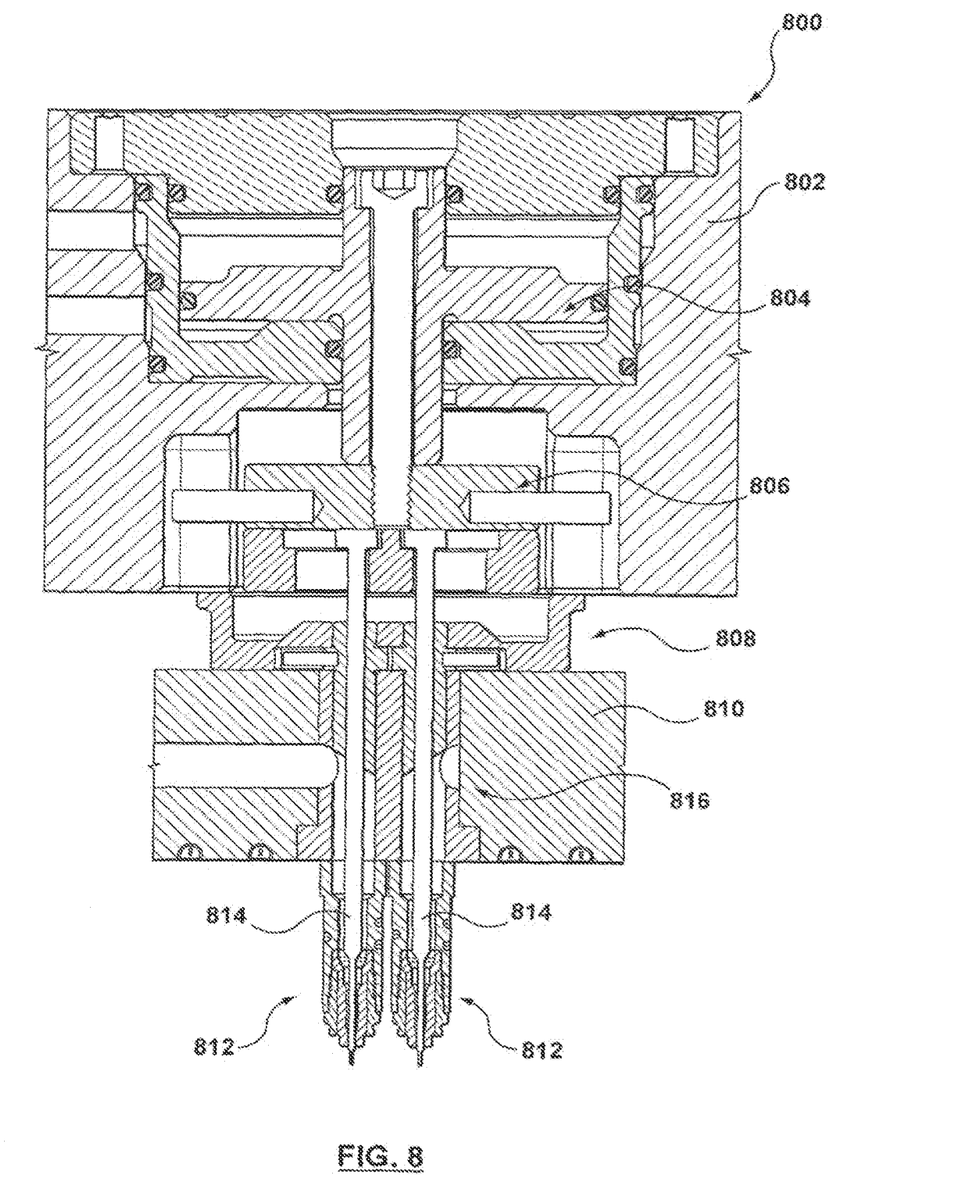
FIG. 8 is a cross-sectional view of a portion of an injection molding apparatus according to another embodiment of the present invention.

FIG. 8 shows a portion of an injection molding apparatus 800 according to another embodiment of the present invention. In the description of this embodiment, like reference numerals in the 800 series are used to describe parts like those in FIG. 1 for ease of understanding. Only differing features and aspects of the present embodiment are described in detail. For description of the like parts, the other embodiments can be referenced. The features and aspects described for the other embodiments can be used accordingly with the present embodiment.

The injection molding apparatus 800 includes a back plate 802, an actuator 804, a valve pin holder 806, a valve pin bushing 808, a manifold 810, four nozzles 812 (two hidden from view), valve pins 814, and a molding material distribution insert 816. The injection molding apparatus 800 can include any number of manifolds and nozzles, in any configuration. In this embodiment, one manifold is shown for simplicity. The injection molding apparatus 800 can include additional components, such as mold plates, alignment dowels, mold gate inserts, and cooling channels, among others. The injection molding apparatus 800 is sometimes called a hot half.

One main difference between the injection molding apparatus 800 and the apparatus 100 described above is that the injection molding apparatus 800 includes four separate nozzles 812, each with its own nozzle channel. The nozzles 812 are can be coupled to the manifold 810 by any means (e.g. flange shouldering, bolts, screw-in, etc.) and each has a separate nozzle channel that communicates with a different drop channel of the insert 816. In this embodiment, the nozzles 812 have flanges that are shouldered on a mold plate (not shown). Flow of molding material through each nozzle 812 is controlled by a different valve pin 814. In addition, in this embodiment each nozzle 812 includes a nozzle body, a nozzle heater, a thermocouple, a terminal end, and a nozzle tip and tip retainer assembly. Of course, in other embodiments, more or fewer nozzles could be used, with the design of the other components being modified accordingly.

Figure 9:
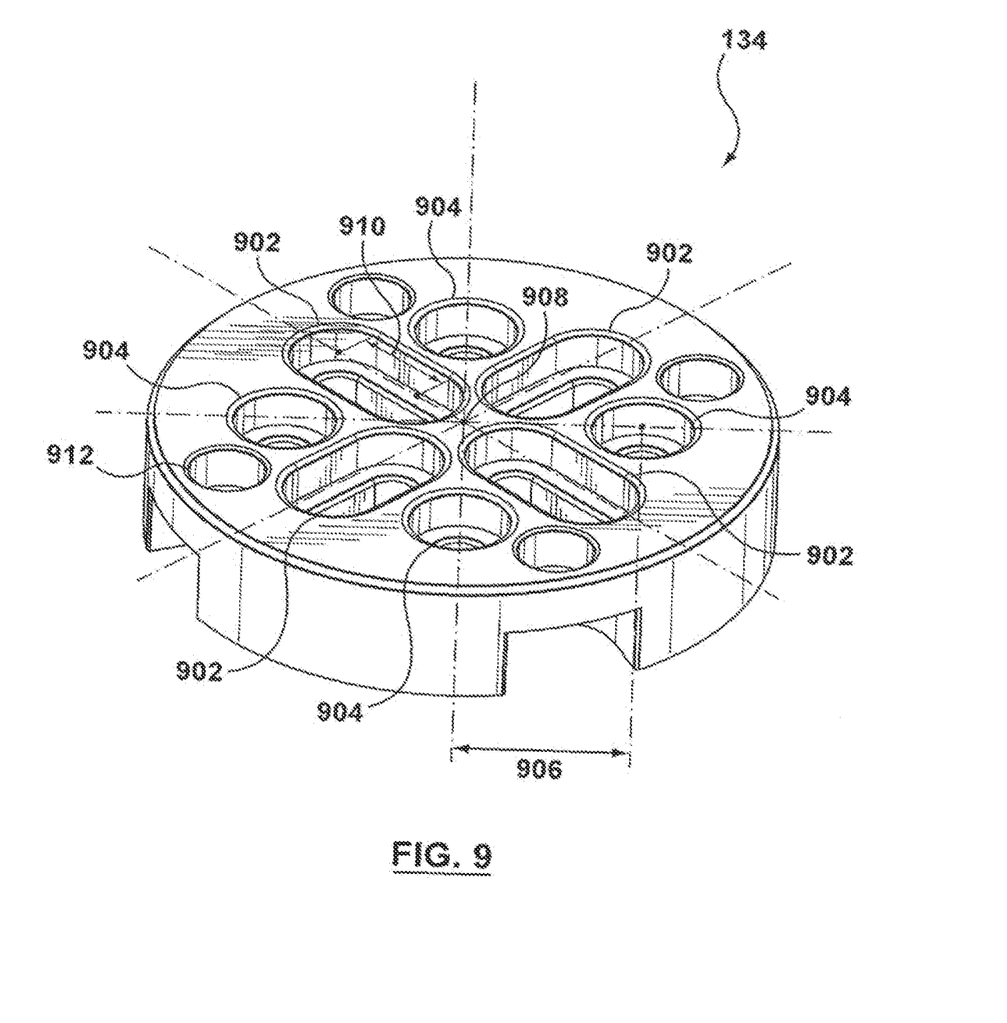
FIG. 9 is a perspective view of the bottom plate of the valve pin holder of FIG. 1 according to an embodiment of the present invention.

FIG. 9 shows a perspective view of the bottom plate 134 of the valve pin holder 106 according to an embodiment of the present invention.

The bottom plate 134 has a plurality of valve pin slots 902 and a plurality of valve pin bores 904. The valve pin slots 902 and bores 904 have T-shaped cross-sections to hold the flattened heads of the valve pins (e.g., ref. 114 of FIG. 1). A center of each valve pin bore 904 is a first distance 906 from a center 908, which need not coincide with the physical center of the bottom plate 134. Each valve pin slot 902 has a length 910 that is collinear with the center 908. A portion of each valve pin slot 902 is the first distance 906 from the center 908. This allows for a variety of arrangements of equally-spaced valve pins using the same "universal" bottom plate 134. For example, if two valve pins are used, two opposite valve pin slots 902 are selected, the length of the slots 902 giving flexibility in locating the valve pins. The same applies for four valve pins, where all four slots 902 are used. If eight valve pins are needed, all of the slots 902 and the bores 904 are filled, with the bores 904 limiting the diameter at which the valve pins can be equally spaced. Of course, other valve pin locations are possible, and more so when the requirement for equal spacing is relaxed.

To secure the valve pins, a top member (e.g., ref. 136 of in FIG. 1) connects to the bottom plate 134 via bolts (not shown) inserted through bolt holes 912 for holding valve pins in any of the valve pin slots 902 and valve pin bores 904.

In other embodiments, the bottom plate 134 can be larger or smaller and thus can have more or fewer slots and bores.

Figure 10:
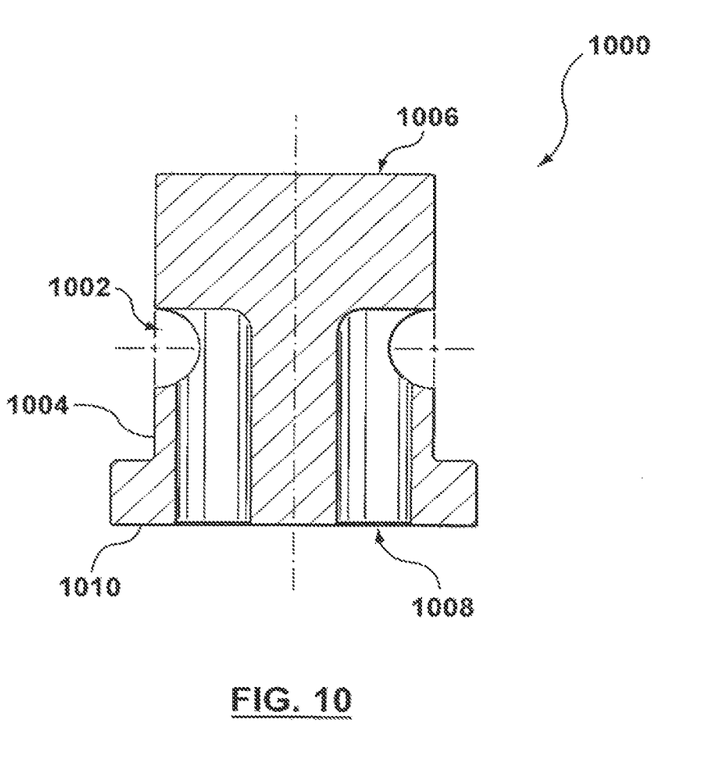
FIG. 10 is a cross-sectional view of a molding material distribution insert according to another embodiment of the present invention.

FIG. 10 shows a cross-sectional view of a molding material distribution insert 1000 according to another embodiment of the present invention. The features and aspects described for the other embodiments can be used accordingly with the present embodiment. The insert 1000 is similar to the other inserts described herein, and only differences are described in detail below.

An open distribution channel 1002 is formed on the cylindrical outer surface 1004 of a cylindrical body 1006, such that the distribution channel 1002 follows a circumferential perimeter of the body 1006. Drop channels 1008 intersect the distribution channel 1002 and exit the body 1006 at a downstream flat end 1010. However, the drop channels 1008 do not exit the body 1006 at the top end and there are no bores for valve pins. As such, the insert 1000 is suitable for thermal gated applications.

Figure 11A:
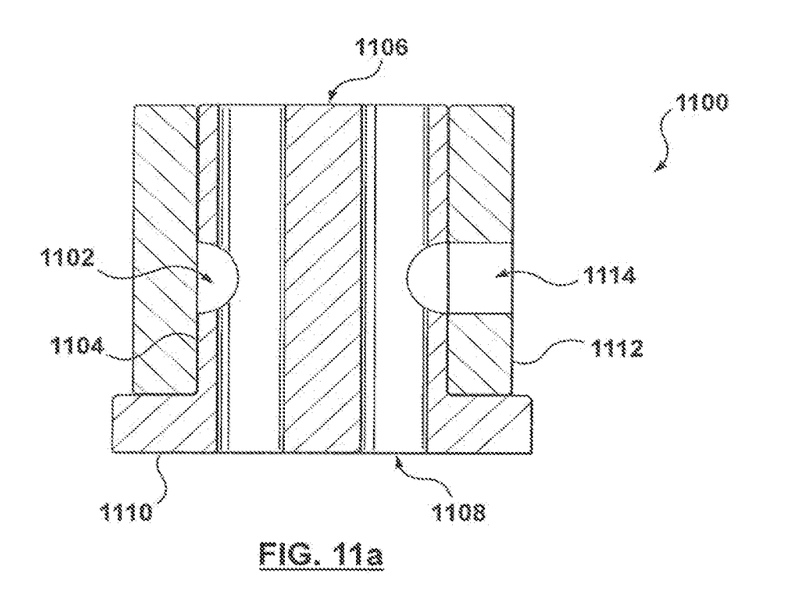
FIGS. 11a and 11b are cross-sectional views of molding material distribution inserts having sleeves according to additional embodiments of the present invention.

FIG. 11*a* shows a cross-sectional view of a molding material distribution insert 1100 according to another embodiment of the present invention. The features and aspects described for the other embodiments can be used accordingly with the present embodiment. The insert 1100 is similar to the other inserts described herein, and only differences are described in detail below.

A distribution channel 1102 is formed on the cylindrical outer surface 1104 of a cylindrical body 1106, such that the distribution channel 1102 follows a circumferential perimeter of the body 1106. Drop channels 1108 extend through the body 1106, intersect the distribution channel 1102 and exit the body 1106 at a downstream flat end 1110. A sleeve 1112 is mated with the cylindrical outer surface 1104 of the body 1106. The sleeve 1112 encloses at least a portion of the distribution channel 1102, which in this embodiment is the entire distribution channel 1102 except for an inlet area fed by a lateral bore 1114 in the sleeve 1112. The sleeve 1112 can be fixed to the cylindrical body 1106 by brazing or shrink-fitting, for example.

Figure 11B:
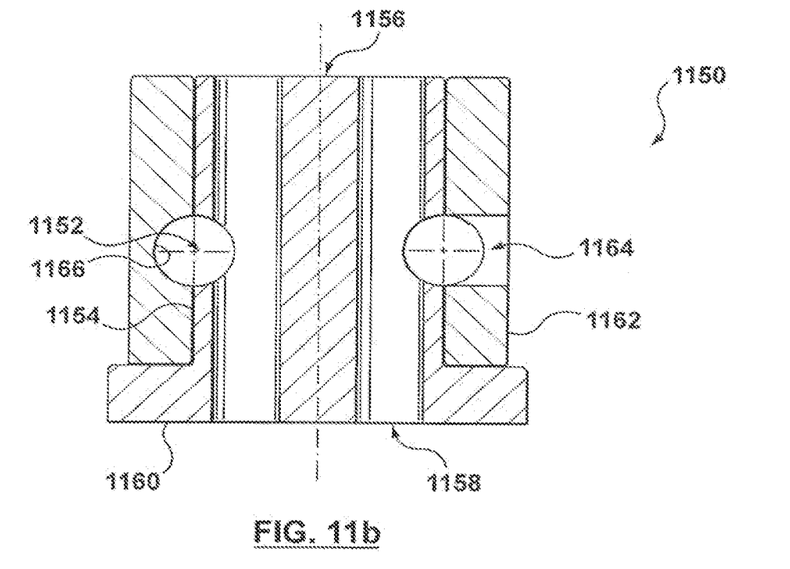

FIG. 11*b* shows a cross-sectional view of a molding material distribution insert 1150 according to another embodiment of the present invention. The features and aspects described for the other embodiments can be used accordingly with the present embodiment. The insert 1150 is similar to the other inserts described herein, and only differences are described in detail below.

A distribution channel 1152 is formed on the cylindrical outer surface 1154 of a cylindrical body 1156, such that the distribution channel 1152 follows a circumferential perimeter of the body 1156. Drop channels 1158 extend through the body 1156, intersect the distribution channel 1152 and exit the body 1156 at a downstream flat end 1160. A sleeve 1162 is mated with the cylindrical outer surface 1154 of the body 1156. The sleeve 1162 encloses at least a portion of the distribution channel 1152, which in this embodiment is the entire distribution channel 1152 except for an inlet area fed by a lateral bore 1164 in the sleeve 1162. Further, in this embodiment, the inside surface of the sleeve 1162 defines a groove 1166, or other curved surface, that defines a portion of the distribution channel 1152. The sleeve 1162 can be fixed to the cylindrical body 1156 by brazing or shrink-fitting, for example.

Figure 12A:
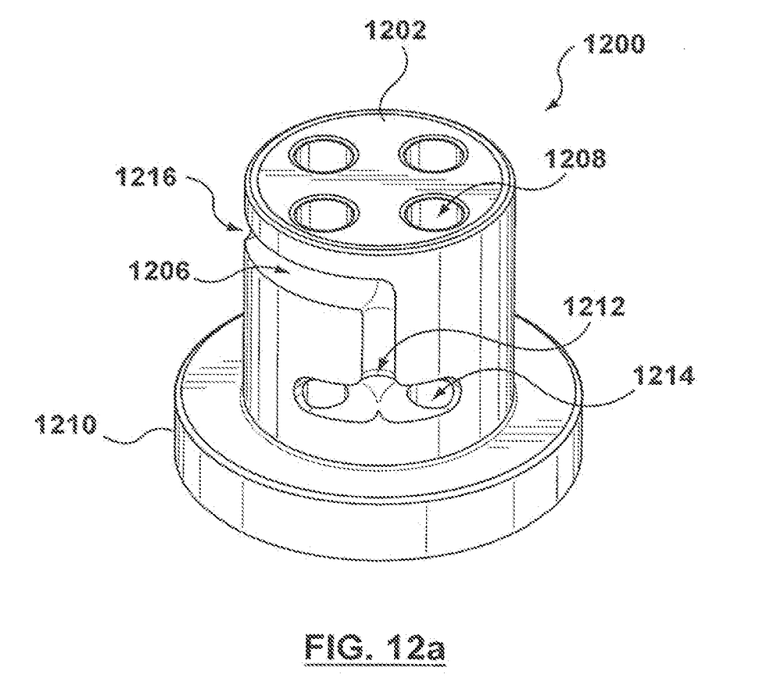
FIG. 12a is a perspective view of a molding material distribution insert with branching according to another embodiment of the present invention.

FIG. 12*a* is a perspective view of a molding material distribution insert 1200 with branching according to another embodiment of the present invention. The features and aspects described for the other embodiments can be used accordingly with the present embodiment. The insert 1200 is similar to the other inserts described herein, and only differences are described in detail below.

The insert 1200 includes a cylindrical body 1202. A distribution channel 1206 is formed in a cylindrical outer surface of the body 1202 and has a portion that follows a semicircular path about halfway around the body 1202, such that the distribution channel 1206 partially circumscribes the cylindrical body 1202. The distribution channel 1206 then turns down (as on the page), and then has at least one branching junction 1212, and in this embodiment has two. Branches 1214 of the distribution channel 1206 intersect drop channels 1208 formed in the body 1202. As the distribution channel 1206 progresses from an inlet area 1216 to the drop channels 1208 it becomes deeper. The upstream, shallower portion of the distribution channel 1206 avoids intersection with a drop channel 1208 before the branching junction 1212. A flange 1210 extends from the body 1202.

Figure 12B:
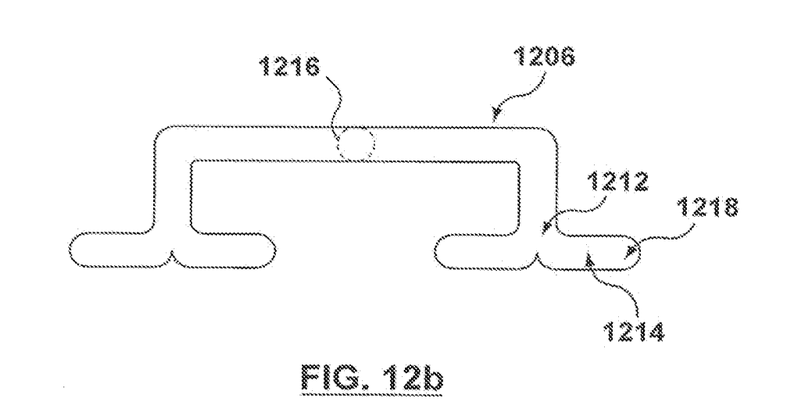
FIG. 12b is a schematic diagram of the distribution channel of FIG. 12a unwrapped.

FIG. 12*b* is a schematic diagram of the distribution channel 1206 unwrapped from the cylindrical body 1202. Additionally shown in this view are the inlet area 1216 and the four ends 1218 of the distribution channel 1206 that intersect with the drop channels 1208.

Figure 13A:
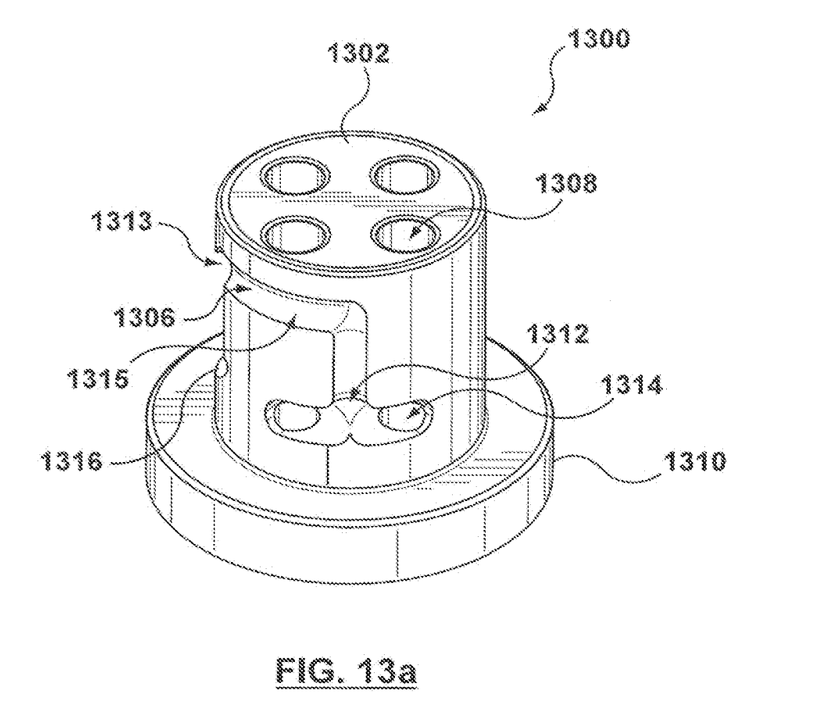
FIG. 13a is a perspective view of a molding material distribution insert with branching according to another embodiment of the present invention.

FIG. 13*a* is a perspective view of a molding material distribution insert 1300 with branching according to another embodiment of the present invention. The features and aspects described for the other embodiments can be used accordingly with the present embodiment. The insert 1300 is similar to the other inserts described herein, and only differences are described in detail below.

The insert 1300 includes a cylindrical body 1302. A distribution channel 1306 is formed in a cylindrical outer surface of the body 1302. The distribution channel 1306 initially runs upwards (as on the page) from an inlet area 1316 and then has a first branching junction 1313. Branches 1215 extend from first branching junction 1313 and partially circumscribe the cylindrical body 1302. Each branch 1315 of the distribution channel 1306 then turns down (as on the page), and then has at least one second branching junction 1312. Secondary branches 1314 of the distribution channel 1306 extend from second branching junction 1312 and intersect drop channels 1308 formed in the body 1302. As the distribution channel 1306 progresses from the inlet area 1316 to the drop channels 1308 it becomes deeper. The upstream, shallower portion of the distribution channel 1306 avoids intersection with a drop channel 1308 before the branching junction 1312. A flange 1310 extends from the body 1302.

Figure 13B:
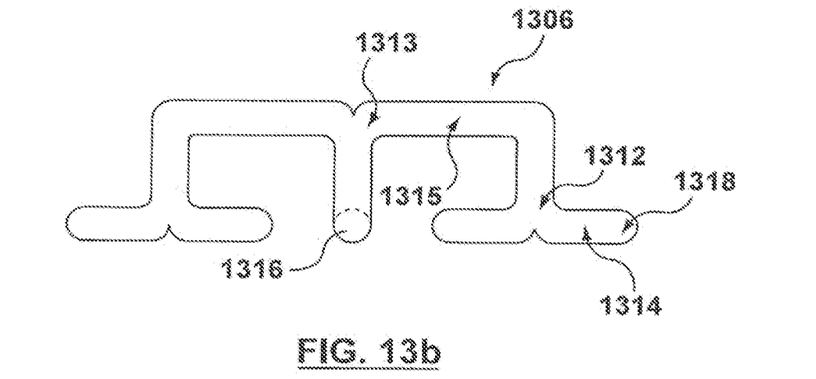
FIG. 13b is a schematic diagram of the distribution channel of FIG. 13a unwrapped.

FIG. 13b is a schematic diagram of the distribution channel 1306 unwrapped from the cylindrical body 1302. Additionally shown in this view are the inlet area 1316 and the four ends 1318 of the distribution channel 1306 that intersect with the drop channels 1308.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. A molding material distribution insert for a hot runner, comprising:
   a cylindrical body having a longitudinal axis;
   a distribution channel formed on a cylindrical outer surface of the body, the distribution channel following a circumferential perimeter of the body, the distribution channel including a branching junction; and
   a plurality of drop channels formed in the body and intersecting the distribution channel, the drop channels exiting the body at a first end of the body.

2. The molding material distribution insert of claim 1, wherein the distribution channel includes a branch extending from the branching junction.

3. The molding material distribution insert of claim 2, wherein the branch intersects one of the plurality of drop channels.

4. The molding material distribution insert of claim 1, wherein the distribution channel includes two branches, each of the two branches extending from the branching junction.

5. The molding material distribution insert of claim 4, wherein each of the two branches intersects a different one of the plurality of drop channels.

6. The molding material distribution insert of claim 1, wherein the distribution channel includes two branching junctions.

7. The molding material distribution insert of claim 6, wherein the distribution channel includes a first pair of branches and a second pair of branches, the first pair of branches extending from one of the two branching junctions and the second pair of branches extending from another of the two branching junctions.

8. The molding material distribution insert of claim 2 further comprising a sleeve mated with the cylindrical outer surface of the body, the sleeve enclosing at least a portion of the distribution channel.

9. The molding material distribution insert of claim 8, wherein the sleeve defines a groove that defines a portion of the distribution channel.

10. The molding material distribution insert of claim 1, wherein the circumferential perimeter is centered about the longitudinal axis.

11. The molding material distribution insert of claim 1, wherein the drop channels exit the body at the first end of the body and a second end of the body.

12. The molding material distribution insert of claim 1, wherein an end of the cylindrical body comprises a flange.

13. The molding material distribution insert of claim 1, wherein the molding material distribution insert is a unitary piece.

14. An injection molding apparatus, comprising:
    a manifold defining a manifold channel;
    one or more nozzles defining a plurality of separate nozzle channels, the one or more nozzles coupled to the manifold, each of the plurality of nozzle channels communicating with a different one of a plurality of mold gates; and
    a molding material distribution insert coupled to the manifold and comprising a body defining a distribution channel in communication with the manifold channel, the distribution channel including a branching junction, and a plurality of drop channels equal in number to the plurality of nozzle channels, the plurality of drop channels intersecting the distribution channel and exiting the body at an end of the body, each drop channel in communication with a different one of the nozzle channels.

15. The injection molding apparatus of claim 14, wherein the distribution channel includes a branch extending from the branching junction.

16. The injection molding apparatus of claim 15, wherein the branch intersects one of the plurality of drop channels.

17. The injection molding apparatus of claim 14, wherein the distribution channel includes two branches, each of the two branches extending from the branching junction.

18. The injection molding apparatus of claim 17, wherein each of the two branches intersects a different one of the plurality of drop channels.

19. The injection molding apparatus of claim 15, further comprising a sleeve mated with the cylindrical outer surface of the body, the sleeve enclosing at least a portion of the distribution channel.

20. The injection molding apparatus of claim 19, wherein the sleeve defines a groove that defines a portion of the distribution channel.

* * * * *